US012007788B2

(12) United States Patent
Tazume

(10) Patent No.: US 12,007,788 B2
(45) Date of Patent: Jun. 11, 2024

(54) AIRCRAFT, CONTROL METHOD, AND CONTROL DEVICE

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/424,925

(22) PCT Filed: Aug. 26, 2020

(86) PCT No.: PCT/JP2020/032114
§ 371 (c)(1),
(2) Date: Jul. 22, 2021

(87) PCT Pub. No.: WO2022/044147
PCT Pub. Date: Mar. 3, 2022

(65) Prior Publication Data
US 2023/0176589 A1  Jun. 8, 2023

(51) Int. Cl.
| G05D 1/04 | (2006.01) |
| B64D 1/22 | (2006.01) |
| B64U 10/14 | (2023.01) |
| G05D 1/00 | (2006.01) |
| B64U 101/60 | (2023.01) |

(52) U.S. Cl.
CPC ............. *G05D 1/042* (2013.01); *B64D 1/22* (2013.01); *B64U 10/14* (2023.01); *B64U 2101/60* (2023.01)

(58) Field of Classification Search
CPC ........ G05D 1/042; G05D 1/0676; B64D 1/22; B64D 1/12; B64D 1/02; B64U 10/14; B64U 2101/60; B64U 2101/64; B64U 2101/67; B64C 1/22
See application file for complete search history.

(56) References Cited

U.S. PATENT DOCUMENTS

| 10,074,284 | B1* | 9/2018 | Priest | G08G 5/0013 |
| 2015/0151837 | A1* | 6/2015 | Sane | G05D 1/0858 |
| | | | | 701/3 |
| 2016/0023761 | A1* | 1/2016 | McNally | B64C 39/024 |
| | | | | 701/3 |
| 2017/0197718 | A1* | 7/2017 | Buchmueller | B64D 1/22 |

(Continued)

FOREIGN PATENT DOCUMENTS

| JP | 2018-047866 A | 3/2018 |
| JP | 2018-510805 A | 4/2018 |

(Continued)

OTHER PUBLICATIONS

International Search Report of PCT/JP2020/032114 dated Nov. 10, 2020 [PCT/ISA/210].

*Primary Examiner* — Abby Y Lin
*Assistant Examiner* — Dylan M Katz
(74) *Attorney, Agent, or Firm* — Sughrue Mion, PLLC

(57) ABSTRACT

An UAV 1 performs a detachment control to detach a cargo supported by a support portion 117 or connected a connecting portion 118, and thereafter, performs a load detection process of detecting a mechanical load applied to the support portion 117 or the connecting portion 118. And then An UAV 1 performs different control according to the mechanical load, with respect to a movement of the UAV 1 after the detection of the mechanical load.

14 Claims, 11 Drawing Sheets

(56) References Cited

U.S. PATENT DOCUMENTS

2018/0072404 A1* 3/2018 Prager ................. B66D 1/60
2018/0099748 A1* 4/2018 Lesperance ............. B64D 1/02
2019/0248489 A1* 8/2019 Jones .................. B64C 39/024

FOREIGN PATENT DOCUMENTS

| JP | 2019-131068 A | 8/2019 |
| JP | 2019-529201 A | 10/2019 |
| WO | 2017/053386 A1 | 3/2017 |
| WO | 2017/053392 A1 | 3/2017 |
| WO | 2017/078118 A1 | 5/2017 |

* cited by examiner

AIRCRAFT, CONTROL METHOD, AND CONTROL DEVICE

CROSS REFERENCE TO RELATED APPLICATIONS

This application is a National Stage of International Application No. PCT/JP2020/032114, filed Aug. 26, 2020.

TECHNICAL FIELD

The present invention relates to a technical field such as a method of executing control to release a cargo carried on an aircraft from the aircraft.

BACKGROUND ART

Conventionally, there has been known an aircraft including a gripper that grips a cargo or a support wire to which the cargo is connected at a distal end thereof in order to transport the cargo by an unmanned aircraft capable of flying. For example, the flight vehicle disclosed in Patent Literature 1 is configured such that a gripper is driven to open and close on the basis of a command from a base station to perform cargo handling. Moreover, the unmanned aerial vehicle disclosed in Patent Literature 2 is configured to detect landing of a cargo when the cargo supported by a support wire is lowered from the sky toward the ground.

CITATION LIST

Patent Literature

Patent Literature 1: JP 2018-47866 A
Patent Literature 2: WO 2017/078118 A
Patent Literature 3: WO 2017/053386 A
Patent Literature 4: WO 2017/053392 A

SUMMARY OF INVENTION

Technical Problem

Meanwhile, in a case where the aircraft described above automatically releases a cargo at a transport destination without manual intervention (that is, in a case where the release control is performed), the cargo may not be appropriately released because the cargo is caught on some part of the aircraft and the like. This is undesirable for the aircraft.

Therefore, one or more embodiments of the present invention are directed to provide an aircraft, a control method, and a control device capable of taking appropriate measures according to a status of success or failure of cargo detachment.

Solution to Problem

In response to the above issue, the emobdiments comprise a control method that is performed by a system including an aircraft that includes a support portion configured to support a cargo or a connecting portion configured to connect the cargo. The control method includes: a first control step of performing detachment control to detach a cargo that is supported by the support portion or connected by the connecting portion from the aircraft; a load detection step of performing a load detection process of detecting a mechanical load applied to the support portion or the connecting portion after the detachment control is performed; and a second control step of performing different control according to the mechanical load, with respect to movement of the aircraft after the mechanical load is detected. Since a status of success or failure of cargo detachment is reflected in the mechanical load detected by the load detection process, it is possible to cause the aircraft to take an appropriate action according to the status of success or failure of cargo detachment.

The control method further include a first determination step of performing a success-failure determination of detachment of the cargo on the basis of the mechanical load, wherein in the second control step, the different control is performed according to a result of the success-failure determination, with respect to movement of the aircraft after the load detection process is performed. This makes it possible to cause the aircraft to take an appropriate action according to the result of the success-failure determination of the cargo detachment (that is, the status of success or failure of the cargo detachment).

The success-failure determination is performed in a state where the aircraft is landing, and in a case where it is determined in the first determination step that the detachment of the cargo has succeeded, in the second control step, control to cause the aircraft to take off is performed. This makes it possible to cause the aircraft to safely take off.

The success-failure determination is performed in a state where the aircraft is landing, and in a case where it is determined in the first determination step that the detachment of the cargo has failed, in the second control step, control to restrict take-off of the aircraft is performed. This makes it possible to secure the safety of the aircraft.

The success-failure determination is performed in a state where the aircraft is flying, and in a case where it is determined in the first determination step that the detachment of the cargo has succeeded, in the second control step, control to cause the aircraft to head toward a next scheduled moving place is performed. This makes it possible to cause the aircraft to safely head toward the next scheduled moving place.

The success-failure determination is performed in a state where the aircraft is flying, and in a case where it is determined in the first determination step that the detachment of the cargo has failed, in the second control step, control to cause the aircraft to hover in air is performed. This makes it possible to secure the safety of the aircraft.

The success-failure determination is performed in a state where the aircraft is flying, and in a case where it is determined in the first determination step that the detachment of the cargo has failed, in the second control step, control to cause the aircraft to land is performed. This makes it possible to prevent the aircraft from moving in an unstable state.

The success-failure determination is performed in a state where the aircraft is flying, the control method further including a second determination step of determining whether or not the aircraft can safely land in a case where it is determined in the first determination step that the detachment of the cargo has failed, and in a case where it is determined in the second determination step that the aircraft can land safely, in the second control step, control to cause the aircraft to land is performed. This makes it possible to cause the aircraft to more safely take off.

The second determination step, it is determined whether or not the aircraft can safely land based on detection data detected by an optical sensor included in the aircraft. This makes it possible to enhance the determination accuracy as to whether or not the aircraft can safely land.

The connecting portion includes a wire to which the cargo is connected and a reel that feeds or winding the wire, and in the second determination step, it is determined whether or not the aircraft can safely land based on a winding amount of the wire. This makes it possible to enhance the determination accuracy as to whether or not the aircraft can safely land.

In the load detection step, the load detection process is performed based on weight data detected by a weight sensor included in the aircraft. This makes it possible to more easily detect the mechanical load applied to the support portion or the connecting portion.

The load detection process is performed in a state where the aircraft is hovering. This makes it possible to enhance the accuracy of detecting the mechanical load applied to the support portion or the connecting portion.

The support portion includes a storage body that stores the cargo, and in the load detection step, the load detection process is performed based on weight data of the storage body detected by the weight sensor. This makes it possible to enhance the accuracy of detecting the mechanical load applied to the support portion or the connecting portion.

The support portion includes a mechanism that supports or releases the cargo, the control method further including a release operation detection step of performing a release operation detection process of detecting a release operation of the mechanism, and in the load detection step, the load detection process is performed after the release operation of the mechanism is detected by the release operation detection process. This makes it possible to distinguish an abnormality occurred in the mechanism of the support portion from an abnormality in a case where the cargo is not released although the mechanism operates normally.

The connecting portion includes a mechanism that connects or releases the cargo, the control method further including a release operation detection step of performing a release operation detection process of detecting a release operation of the mechanism, and in the load detection step, the load detection process is performed after the release operation of the mechanism is detected by the release operation detection process. This makes it possible to distinguish an abnormality occurred in the mechanism of the connecting portion from an abnormality in a case where the cargo is not released although the mechanism operates normally.

The detachment control includes control to cause the mechanism to perform the release operation.

The mechanism includes an actuator, and the release operation is performed by driving the actuator.

The mechanism includes an electromagnet, and the release operation is performed by stopping energization to the electromagnet.

The embodiments comprise an aircraft including: a support portion configured to support a cargo or a connecting portion configured to connect the cargo; a first control unit that performs detachment control to detach a cargo that is supported by the support portion or connected by the connecting portion from the aircraft; a load detection unit that performs a load detection process of detecting a mechanical load applied to the support portion or the connecting portion after the detachment control is performed; and a second control unit that performs different control according to the mechanical load, with respect to movement of the aircraft after the mechanical load is detected.

The embodiments comprise a control device for controlling an aircraft including a support portion configured to support a cargo or a connecting portion configured to connect the cargo, the control device including: a first control unit that performs detachment control to detach a cargo that is supported by the support portion or connected by the connecting portion from the aircraft; a load detection unit that performs a load detection process of detecting a mechanical load applied to the support portion or the connecting portion after the detachment control is performed; and a second control unit that performs different control according to the mechanical load, with respect to movement of the aircraft after the mechanical load is detected.

Advantageous Effect of the Invention

According to one or more embodiments of the present invention, it is possible to cause the aircraft to take an appropriate action according to the status of success or failure of cargo detachment.

BRIEF DESCRIPTION OF THE DRAWINGS

FIG. 1 is a diagram illustrating a schematic configuration example of a cargo transport system S.

DESCRIPTION OF EMBODIMENTS

Hereinafter, an embodiment of the present invention will be described with reference to the drawings.

Incidentally, the following embodiment is an embodiment in a case where the present invention is applied to a cargo transport system that transports a cargo.

[1. Configuration and Function Outline of Cargo Transport System S]

Figure 1:
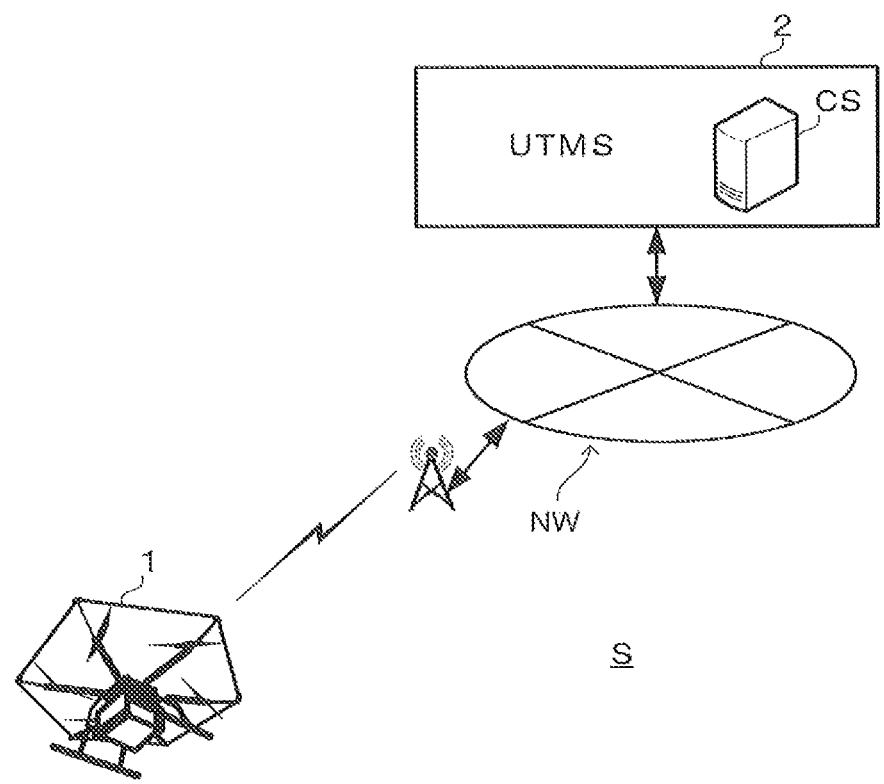
FIG. 1 is

First, a configuration and an outline of an operation of a cargo transport system S according to the present embodiment will be described with reference to FIG. 1. FIG. 1 is a diagram illustrating a schematic configuration example of the cargo transport system S. As illustrated in FIG. 1, the cargo transport system S is configured to include an unmanned aerial vehicle (hereinafter, referred to as "UAV (Unmanned Aerial Vehicle)") 1 that flies in the atmosphere (in the sky) and an operation management system (hereinafter, referred to as "UTMS (UAV Traffic Management System)") 2. The UAV 1 and the UTMS 2 can communicate with one another via a communication network NW. The communication network NW includes, for example, the Internet, a mobile communication network, a radio base station thereof, and the like. Incidentally, although one UAV 1 is shown in the example of FIG. 1, there may be a plurality of UAVs 1.

The UAV 1 is capable of flying according to remote control from the ground by an operator or flying autonomously for the transportation (for example, the delivery) of a cargo. The UAV 1 is also called a drone or a multi-copter. Examples of the cargo include a product, a home delivery article, an emergency supply, a relief supply, and the like, but any article may be transported as long as the cargo can be transported by the UAV 1. The UAV 1 detaches (in other words, separates) the cargo at a transport destination of the cargo (an example of a scheduled moving place). Incidentally, the UAV 1 is managed by a GCS (Ground Control Station) and can be remotely controlled by an operator from the ground. For example, the GCS is installed as an application in an operation terminal that can be connected to the communication network NW. In this case, the operator is, for example, a person who operates the operation terminal or a controller provided in the operation terminal. Alternatively, the GCS may be systemized by a server or the like. In this case, the operator is, for example, a system manager or a controller provided in the server.

The UTMS 2 includes one or more servers including a control server CS. The UTMS 2 manages traffic and flight of the UAV 1. The traffic management of the UAV 1 includes management of a traffic plan of the UAV 1; management of a flight status of the UAV 1, and control of the UAV 1. The traffic plan of the UAV 1 is a flight plan including a flight route (scheduled route) from a departure point (flight start point) to a transport destination (a waypoint or a destination point) for a cargo. The flight route is represented by, for example, latitude and longitude on the route, and may include flight altitude. The management and control of the flight status of the UAV 1 is performed based on aircraft information of the UAV 1. The aircraft information of the UAV 1 includes at least positional information of the UAV 1. The positional information of the UAV 1 indicates the current position of the UAV 1. The current position of the UAV 1 is a flight position of the UAV 1 in flight. The aircraft information of the UAV 1 may include speed information of the UAV 1. The speed information indicates a flight speed of the UAV 1.

[2. Configuration and Function Outline of UAV 1]

Figure 2:
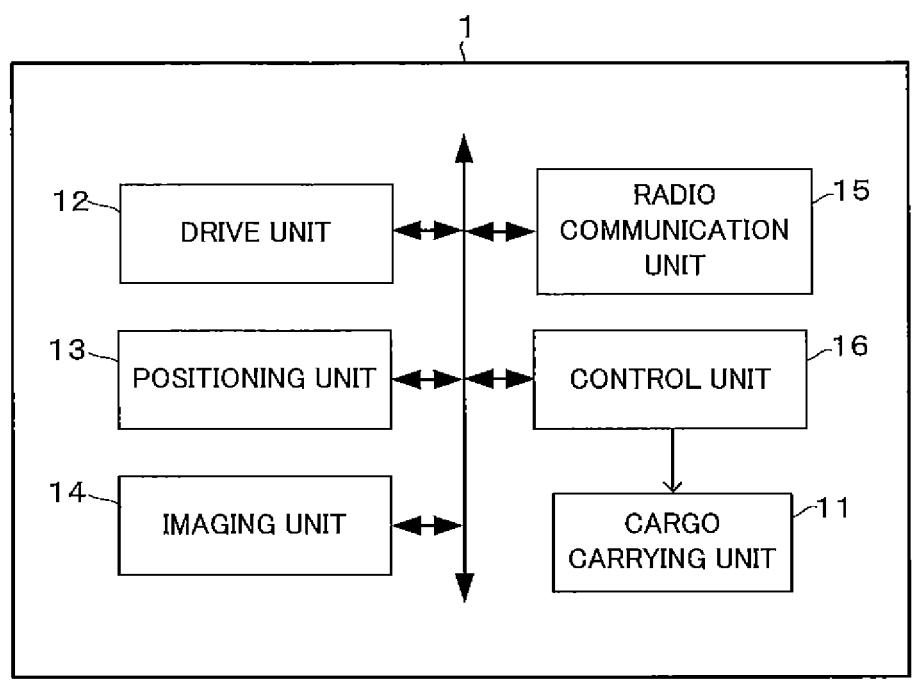
FIG. 2 is a diagram illustrating a schematic configuration example of an UAV 1.

Next, a configuration and an outline of a function of the UAV 1 will be described with reference to FIG. 2 and the like. FIG. 2 is a diagram illustrating a schematic configuration example of the UAV 1. As illustrated in FIG. 2, the UAV 1 includes a cargo carrying unit 11, a drive unit 12, a positioning unit 13, an image capturing unit 14, a radio communication unit 15, a control unit 16, and the like. The control unit 16 is an example of a control device. Although not illustrated, the UAV 1 includes a rotor (a propeller) that is a horizontal rotary wing, various sensors, a battery that supplies power to each unit of the UAV 1, and the like. The various sensors include a triaxial acceleration sensor, a geomagnetic sensor, and the like. Moreover, the various sensors may include at least any one of a weight sensor, a torque sensor, an optical sensor, and an ultrasonic sensor. Detection data detected by the various sensors is output to the control unit 16. Incidentally, the UAV 1 may include a speaker for outputting sound.

Figure 3:
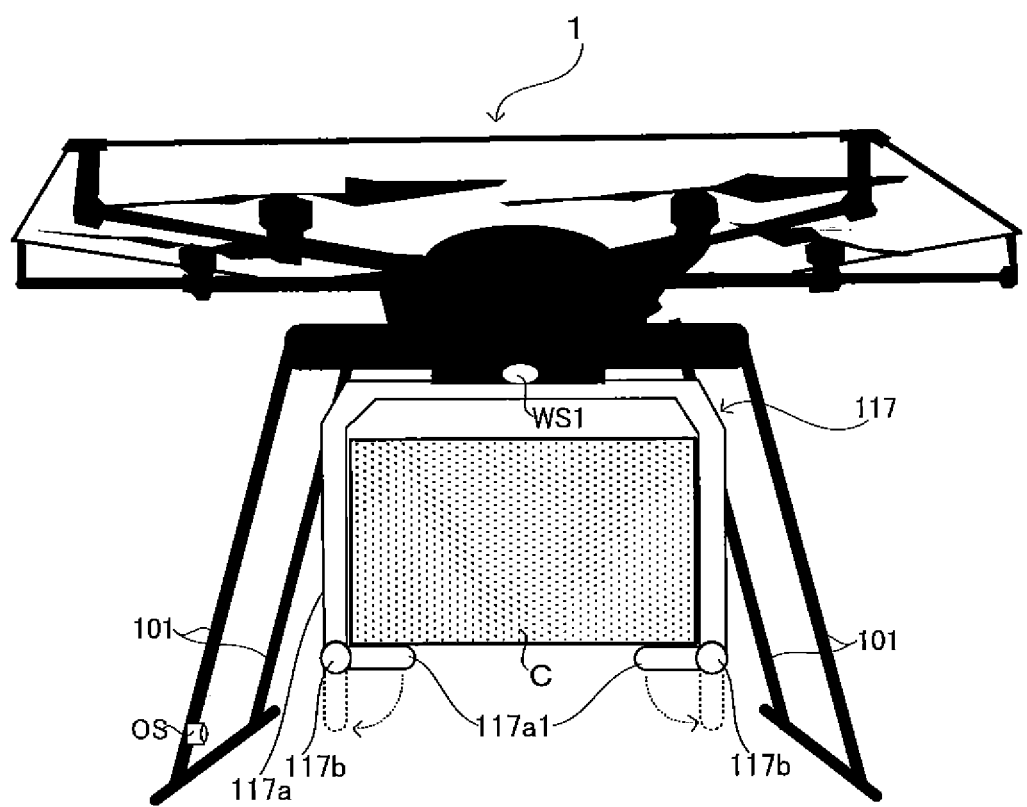
FIG. 3 is a diagram illustrating an example of an appearance of the UAV 1 including a support portion 117.

The cargo carrying unit 11 is used to carry one or a plurality of cargoes, and includes at least one of a support portion 117 for supporting the cargo carried and a connecting portion 118 for connecting the cargo. FIG. 3 is a diagram illustrating an example of an appearance of the UAV 1 including the support portion 117. As illustrated in FIG. 3, the support portion 117 includes a storage body 117a for storing a cargo C and drive mechanisms 117b for supporting or releasing the cargo C. The storage body 117a may be configured to be capable of storing a plurality of the cargoes C. Each of the drive mechanisms 117b includes an actuator that converts a control signal (an electric signal) output from the control unit 16 into a mechanical operation. The actuator is configured to include, for example, a motor or the like. Moreover, the storage body 117a includes cargo receivers 117a1 that receive the cargo C. Each of the cargo receivers 117a1 is rotationally driven in an arrow direction by the drive mechanism 117b (that is, the cargo receiver 117a1 shifts from a closed state to an open state). Such rotational drive (in other words, a release operation) allows the cargo C to be released (in this example, drop) from the support portion 117. The release operation is performed by driving the actuator in the drive mechanism 117b.

Incidentally, in the example of FIG. 3, since the side surface of the cargo C is not covered by the storage body 117a, the cargo C can be visually recognized from the outside of the storage body 117a. However, the storage body 117a may be formed in a box shape so as to cover the side surface of the cargo C. That is, the storage body 117a may be configured as a storage box. In this case, the cargo C cannot be visually recognized from the outside of the storage body 117a. Moreover, the support portion 117 may include a catcher (or an arm) capable of gripping the cargo C (or a ring attached to the cargo C) instead of the cargo receivers 117a1 in order to support the cargo C. The release operation in this case is also performed by driving the actuator in the drive mechanism 117b. Alternatively, in order to support the cargo C, the support portion 117 may include a drive mechanism having an electromagnet capable of attracting a magnet attached to the cargo C by a magnetic force, instead of the drive mechanism 117b and the cargo receiver 117a1. The release operation in this case is performed by stopping energization to the electromagnet.

Figure 4:
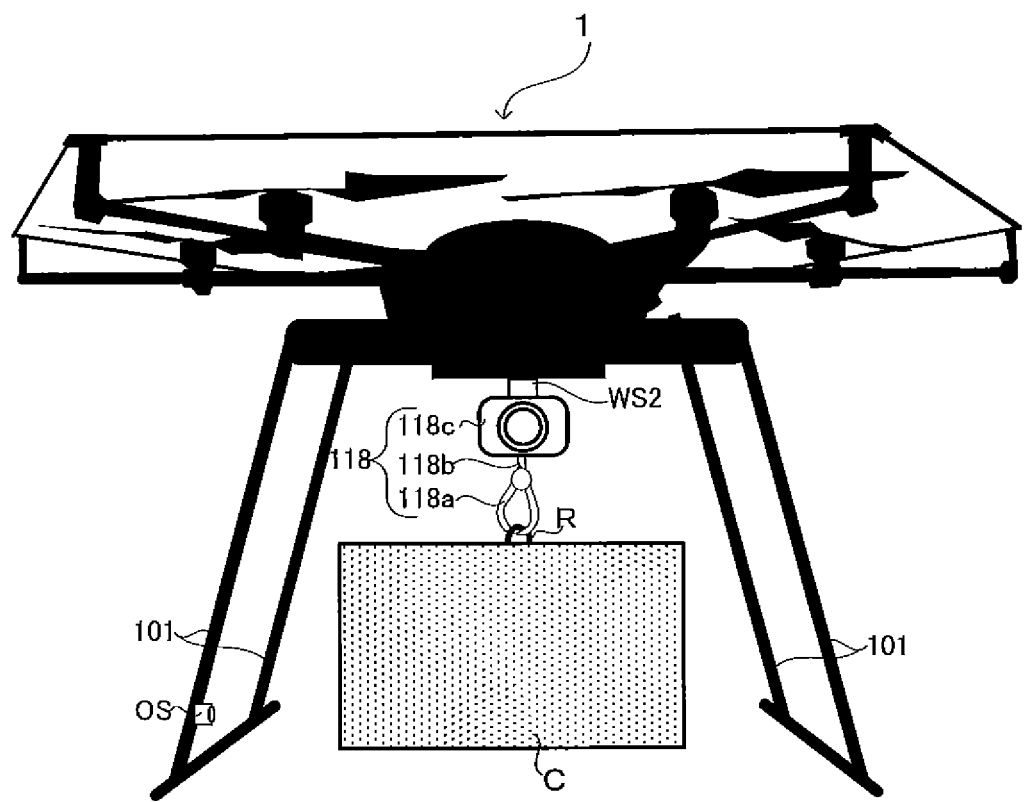
FIG. 4 is a view illustrating an example of an appearance of the UAV 1 including a connecting portion 118.

FIG. 4 is a view illustrating an example of an appearance of the UAV 1 including the connecting portion 118. As illustrated in FIG. 4, the connecting portion 118 includes a hook 118a for hooking a ring R attached to the cargo C, a wire 118b to which the cargo C is connected via the hook 118a, and a reel (a winch) 118c that feeds or winds the wire 118b. The reel 118c includes a motor, and its drive is controlled by the control unit 16. The hook 118a may hook rings R attached to a plurality of cargoes C. Moreover, the hook 118a may include a drive mechanism for automatically connecting or releasing the cargo C. The operation of the drive mechanism (that is, the opening and closing operation of the hook 118a) is performed by driving an actuator in the drive mechanism. Incidentally, the connecting portion 118 may include a catcher (or an arm) capable of gripping the cargo C itself (or the ring R attached to the cargo C) instead of the hook 118a in order to connect the cargo C. Alternatively, in order to connect the cargo C, the connecting portion 118 may include a drive mechanism having an electromagnet capable of attracting a magnet attached to the cargo C by a magnetic force, instead of the hook 118a. The release operation in this case is performed by stopping energization to the electromagnet.

The drive unit 12 includes a motor, a rotating shaft, and the like. The drive unit 12 rotates a plurality of rotors by a motor, a rotating shaft, and the like that are driven according to a control signal output from the control unit 16. The positioning unit 13 includes a radio wave receiver, an altitude sensor (for example, an atmospheric pressure sensor or a TOF sensor), and the like. The positioning unit 13 receives, for example, a radio wave transmitted from a GNSS (global navigation satellite system) satellite with a radio receiver, and detects the current position (the latitude and longitude) of the UAV 1 in a horizontal direction on the basis of the radio wave. The current position of the UAV 1 is the flight position of the UAV 1 in flight. Incidentally, the current position of the UAV 1 in the horizontal direction may be corrected on the basis of the image data captured by the image capturing unit 14 or the radio wave transmitted from the radio base station.

Furthermore, the positioning unit 13 may detect the current position (the altitude) of the UAV 1 in a vertical direction by the altitude sensor. The positional information indicating the current position detected by the positioning unit 13 is output to the control unit 16. The image capturing unit 14 includes a camera (an RGB camera or an infrared camera). The image capturing unit 14 continuously captures a real space within a range falling within the angle of view of the camera. Image data captured by the image capturing unit 14 is output to the control unit 16. The radio communication unit 15 controls communication performed via a communication network NW.

Figure 5:
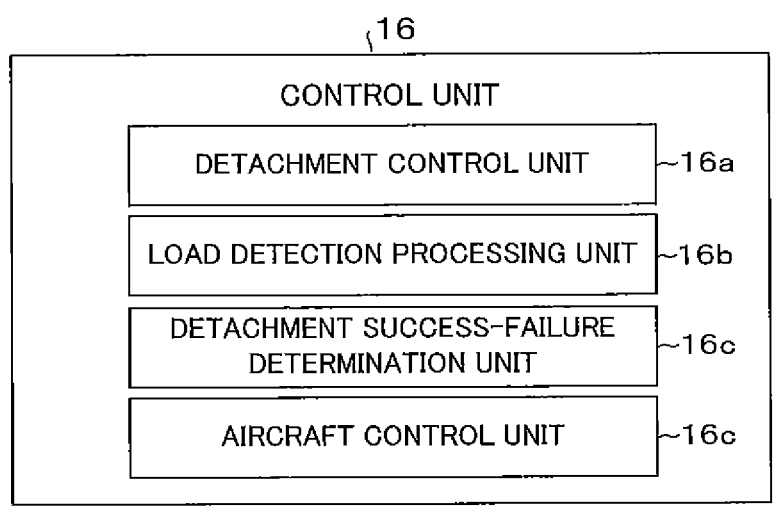
FIG. 5 is a diagram illustrating an example of functional blocks in a control unit 16.

The control unit 16 includes a CPU (central processing unit) that is a processor, a ROM (read only memory), a RAM (random access memory), a nonvolatile memory, and the like. FIG. 5 is a diagram illustrating an example of functional blocks in the control unit 16. As illustrated in FIG. 5, the control unit 16 functions as a detachment control unit 16a, a load detection processing unit 16b, a detachment success-failure determination unit 16c, an aircraft control unit 16d, and the like according to a program stored in, for example, a ROM or a nonvolatile memory. Here, the detachment control unit 16a is an example of a first control unit. The aircraft control unit 16d is an example of a second control unit. Incidentally, the nonvolatile memory stores therein an aircraft ID for identifying the UAV 1 and address information for accessing a control server CS. The control unit 16 transmits the aircraft ID and the aircraft information of the UAV 1 to the control server CS via the radio communication unit 15 at regular intervals or irregular intervals.

The detachment control unit 16a performs (executes) detachment control to detach the cargo C supported by the support portion 117 or the cargo C connected by the connecting portion 118 from the UAV 1 in a state where the UAV 1 is flying or in a state where the UAV 1 is landing. Here, the state where the UAV 1 is flying is a state where the UAV 1 is moving (that is, moving in a horizontal direction, a vertical direction, or an oblique direction) in the air or a state where the UAV 1 is hovering (that is, the UAV 1 is stationary in the air). However, the state where the UAV 1 is hovering is not limited to a state where the UAV 1 is completely stationary in the air, and the UAV 1 may slightly move (that is, it is only required that the UAV 1 is floating in the air without landing.).

Figure 6:
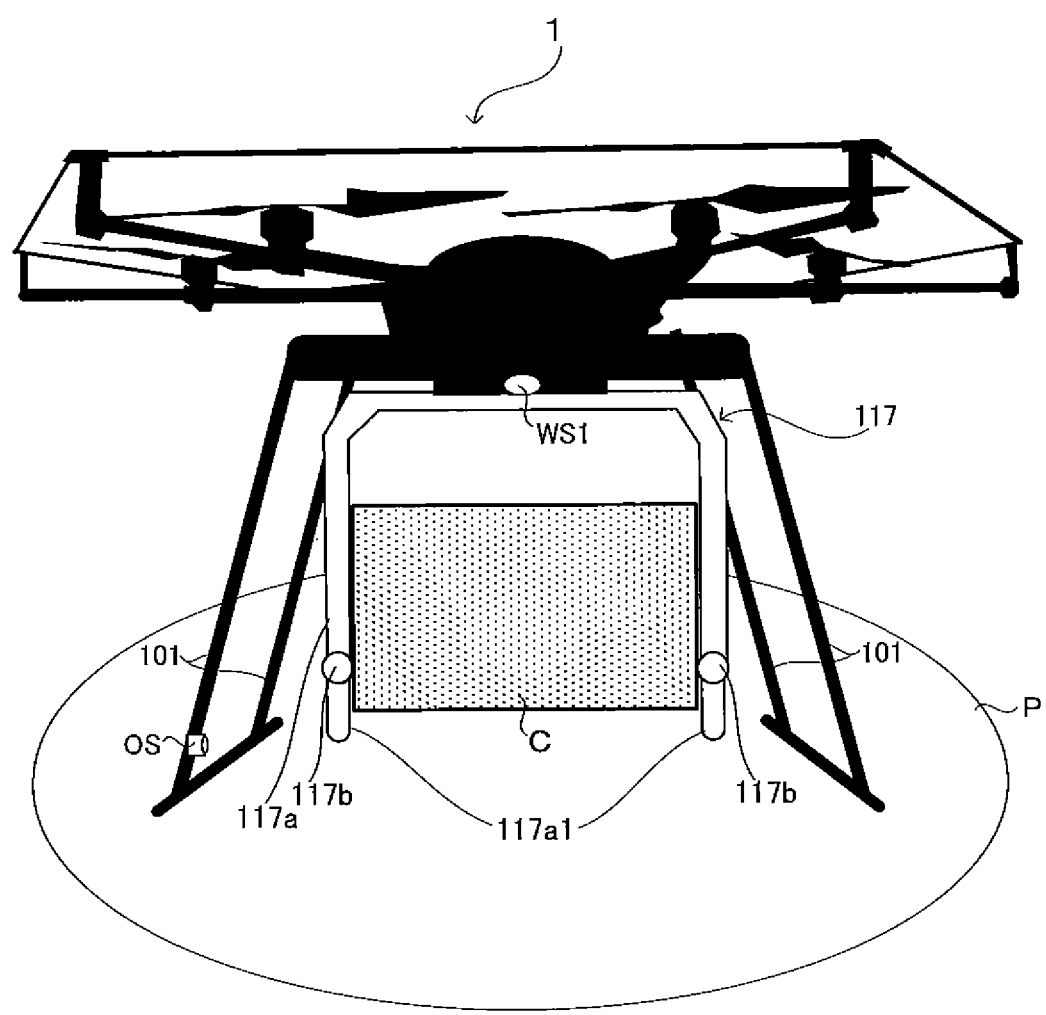
FIG. 6 is a diagram illustrating a state where detachment control is performed in a state in which the UAV 1 is landing.

The detachment control to detach the cargo C from the UAV 1 is performed by the detachment control unit 16a outputting a control signal to the support portion 117 or the connecting portion 118. The detachment control includes, for example, control to cause the drive mechanism of the support portion 117 or the connecting portion 118 to perform a release operation. Here, the control to cause the drive mechanism of the support portion 117 to perform the release operation is desirably performed in a state where the UAV 1 is landing, but may be performed in a state where the UAV 1 is flying. FIG. 6 is a diagram illustrating a state where the detachment control is performed in a state in which the UAV 1 is landing. In the example of FIG. 6, the cargo C is released in a ground direction from the UAV 1 landing on a port (a take-off and landing facility) P installed on the ground of a transport destination. However, depending on the type of the cargo (for example, an article that does not break even when dropped), the cargo C may be dropped in the ground direction from the UAV 1 hovering above the port P installed on the ground of the transport destination. Incidentally, in a case where the drive mechanism having an electromagnet, which has been described above, is included in the support portion 117, the detachment control described above is control to stop energization to the electromagnet in a state where the UAV 1 is landing (that is, control to cause the drive mechanism having the electromagnet to perform the release operation).

Figure 7:
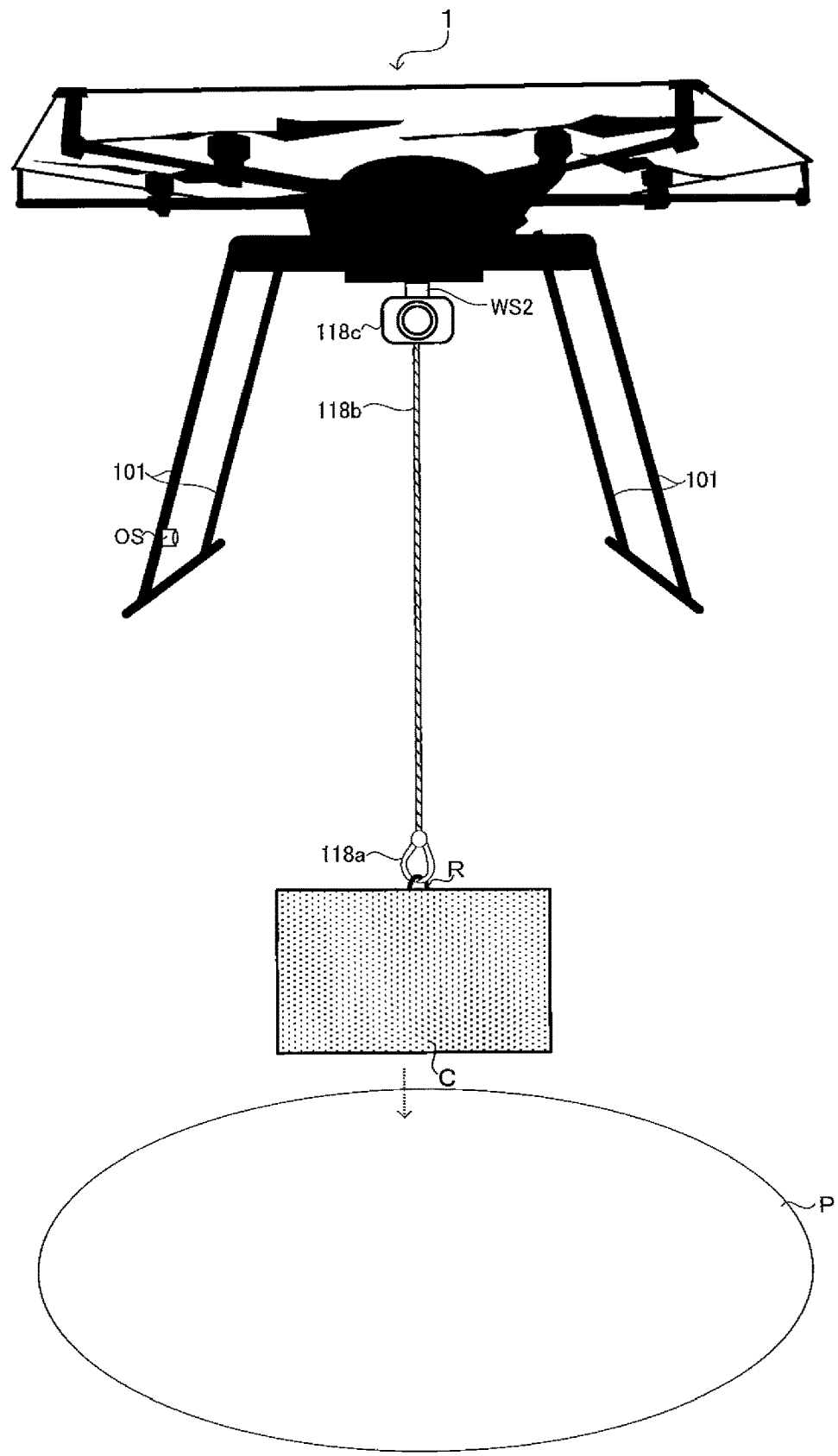
FIG. 7 is a diagram illustrating a state where detachment control is performed in a state where the UAV 1 is hovering.

On the other hand, the control to cause the drive mechanism of the connecting portion 118 to perform the release operation is performed in a state where the UAV 1 is hovering. FIG. 7 is a diagram illustrating a state where the detachment control is performed in a state where the UAV 1 is hovering. In the example of FIG. 7, the wire 118b is fed from the UAV 1 hovering above the port P installed on the ground of a transport destination, so that the cargo C is lowered toward the ground. Incidentally, the control to cause the drive mechanism of the connecting portion 118 to perform the release operation may be performed in the state where the UAV 1 is landing. Moreover, in the example of FIG. 7, in a case where the cargo C is manually removed from the hook 118a, the detachment control can also be referred to as control in which the wire 118b is fed from the reel 118c of the connecting portion 118 (that is, the cargo C is lowered). Moreover, in a case where the drive mechanism having an electromagnet, which has been described above, is included in the connecting portion 118, the detachment control is, for example, control to stop energization to the electromagnet in a state where the cargo C is landing on the port P.

After the detachment control is performed, the load detection processing unit 16b performs a load detection process of detecting a mechanical load applied to the support portion 117 or the connecting portion 118 (in other words, the mechanical load acting on the support portion 117 or the connecting portion 118). For example, the load detection processing unit 16b can more easily detect the mechanical load applied to the support portion 117 or the connecting portion 118 by performing the load detection process on the basis of the weight data detected by the weight sensor included in the UAV 1. In this case, the mechanical load is expressed in weight. The weight sensor is attached to a position of the UAV 1 where the weight of the cargo C can be detected. Incidentally, the load detection process can be performed in either a state where the UAV 1 is moving in the air or a state where the UAV 1 is hovering, but the weight data can be detected more accurately when the load detection process is performed in the state where the UAV 1 is hovering.

In the example of FIG. 3, a weight sensor WS1 is attached to an upper portion of the storage body 117a. In this case, the load detection processing unit 16b performs the load detection process of detecting the mechanical load applied to the support portion 117 on the basis of the weight data that is detected by the weight sensor WS1 and indicates the weight of the support portion 117 (the storage body 117a). As a result, the accuracy of detecting the mechanical load applied to the support portion 117 can be enhanced. For example, in a case where the cargo C is released from the support portion 117, the weight of the storage body 117a does not include the weight of the cargo C, so that the weight detected is small (that is, the mechanical load is light). On the other hand, in a case where the cargo C is not released from the support portion 117, the weight of the storage body 117a includes the weight of the cargo C, so that the weight detected is large. The case where the cargo C is not released from the support portion 117 includes, for example, a case where the cargo C is caught in the storage body 117a and thus not completely released from the support portion 117.

Incidentally, the weight sensor WS1 may be attached to the cargo receiver 117a1 so as to be able to detect only the weight of the cargo C in a state where the cargo receiver 117a1 is closed. In this case, when the cargo receiver 117a1 is opened, the weight of the cargo C is not detected (that is, no pressure is applied from the cargo C), and thus it is assumed that the cargo C is released. However, in this case, if the cargo C is caught in the storage body 117a, the weight of the cargo C is not detected even though the cargo C is not released (that is, it is erroneously assumed that the cargo C is released). Consequently, as illustrated in FIG. 3, the accuracy of detecting the mechanical load applied to the entire support portion 117 can be more enhanced when the weight sensor WS1 is attached to the upper portion of the storage body 117a.

On the other hand, in the example of FIG. 4, a weight sensor WS2 is attached to the upper portion of the reel 118c. In this case, the load detection processing unit 16b performs the load detection process of detecting the mechanical load applied to the connecting portion 118 on the basis of the weight data that is detected by the weight sensor WS2 and indicates the weight of the connecting portion 118. As a result, the accuracy of detecting the mechanical load applied to the connecting portion 118 can be enhanced. For example, in a case where the cargo C is released from the connecting portion 118, the weight of the connecting portion 118 does not include the weight of the cargo C, so that the weight detected is small. On the other hand, in a case where the cargo C is not released from the connecting portion 118, the weight of the connecting portion 118 includes the weight of the cargo C, so that the weight detected is large. The case where the cargo C is not released from the connecting portion 118 includes, for example, a case where the cargo C is caught by the wire 118b or the hook 118a and thus not completely released from the connecting portion 118.

Moreover, the mechanical load may be detected without using a weight sensor. For example, the load detection processing unit 16b may detect the rotation speed of the motor of the rotor in a state where the UAV 1 is hovering, and perform the load detection process on the basis of the rotation speed detected. In this case, the mechanical load is represented by the rotation speed per unit time. For example, in a case where the cargo C is released from the support portion 117 or the connecting portion 118, the support portion 117 or the connecting portion 118 is light, and thus the rotation speed detected is small. On the other hand, in a case where the cargo C is not released from the support portion 117 or the connecting portion 118, the support portion 117 or the connecting portion 118 is heavy, and thus the rotation speed detected is large.

As another example, the load detection processing unit 16b may calculate the climbing speed of the UAV 1 from the flight altitude (the altitude difference) detected by the altitude sensor and the time in a state where the motor of the rotor is controlled to have a predetermined rotation speed. And then, the load detection processing unit 16b may perform the load detection process of detecting the mechanical load applied to the support portion 117 or the connecting portion 118 on the basis of the climbing speed calculated. In this case, the mechanical load applied to the support portion 117 or the connecting portion 118 is represented by the climbing speed. For example, in a case where the cargo C is released from the support portion 117 or the connecting portion 118, the support portion 117 or the connecting portion 118 is light, and thus the climbing speed calculated increases. On the other hand, in a case where the cargo C is not released from the support portion 117 or the connecting portion 118, the support portion 117 or the connecting portion 118 is heavy, and thus the climbing speed calculated decreases.

Alternatively, in a case where the UAV 1 includes the connecting portion 118, the load detection processing unit 16b may measure the torque of the motor of the reel 118c by the torque sensor. And then, the load detection processing unit 16b may perform the load detection process of detecting the mechanical load applied to the connecting portion 118 on the basis of the torque measured. In this case, the mechanical load applied to the connecting portion 118 is represented by torque. For example, in a case where the cargo C is released from the connecting portion 118, the connecting portion 118 is light, and thus the torque measured is small. On the other hand, in a case where the cargo C is not released from the connecting portion 118, the connecting portion 118 is heavy, and thus the torque measured is large. Alternatively, the load detection processing unit 16b may measure the tension of the wire 118b and perform the load detection process of detecting the mechanical load applied to the connecting portion 118 on the basis of the tension measured.

The detachment success-failure determination unit 16c determines the success or failure of the detachment of the cargo C on the basis of the mechanical load detected by the load detection processing unit 16b. As a result, it is possible to cause the UAV 1 to take an appropriate action according to the result of determination of the success or failure of the detachment of the cargo C (that is, the status of success or failure of cargo detachment). For example, in a state where the UAV 1 is flying or in a state where the UAV 1 is landing, it is determined whether the mechanical load is larger than a threshold value. Here, in a case where the mechanical load is represented by weight, the threshold value is set in advance to, for example, the weight (known) of the support portion 117 or the connecting portion 118 in a case where the cargo C is not carried in a state where the UAV 1 is hovering+margin. Alternatively, in a case where the mechanical load is represented by the rotation speed, the threshold value is set in advance to the rotation speed of the motor in a case where the cargo C is not carried in a state where the UAV 1 is hovering (in other words, the rotation speed of the motor at which the hovering state of the UAV 1 is maintained in the case where the cargo C is not carried)+margin.

And then, in a case where the mechanical load is not larger than the threshold value (less than the threshold value), it is determined that the detachment of the cargo C has succeeded. On the other hand, in a case where the mechanical load is larger than the threshold value, it is determined that the detachment of the cargo C has failed.

Alternatively, in a case where the mechanical load is represented by the climbing speed, the threshold value is set in advance to a climbing speed (an average value) in a case where the cargo C is not carried. In this case, in a case where the mechanical load is not larger than the threshold value (that is, the climbing speed is slow), it is determined that the detachment of the cargo C has failed. On the other hand, in a case where the mechanical load is larger than the threshold value, it is determined that the detachment of the cargo C has succeeded.

Meanwhile, the success or failure of the detachment of the cargo C can be determined by using the image data captured by the camera. However, in a case where the support portion 117 includes a storage body (a storage box) in which the cargo C cannot be visually recognized from the outside, it is difficult to determine the success or failure of the detachment of the cargo C by using the image data captured by the camera. Moreover, in a case where there is a blind spot in which the cargo C cannot be captured depending on the attachment position of the camera, it is difficult to determine the success or failure of the detachment of the cargo C by using the image data captured by the camera (this problem is particularly noticeable in a case where a plurality of cargoes C are loaded). On the other hand, these problems can be solved by using the mechanical load detected by the load detection processing unit 16b, and the success or failure of the detachment of the cargo C can be accurately determined.

The aircraft control unit 16d performs the aircraft control of the UAV 1 using the positional information acquired from the positioning unit 13, the image data acquired from the image capturing unit 14, the detection data acquired from various sensors, and the flight plan information indicating a flight plan. In the aircraft control, for example, the rotation speed of the motor of the rotor, and the position, posture, and traveling direction of the UAV 1 are controlled. Moreover, the aircraft control of the UAV 1 includes take-off control of the UAV 1, movement control of the UAV 1, hovering control of the UAV 1, landing control of the UAV 1, and the like. Here, the take-off control of the UAV 1 includes control to cause the UAV 1 not to take off depending on the situation. Incidentally, the flight plan information is acquired from, for example, the GCS or the UTMS 2. The flight plan information includes positional information of a transport destination of the cargo C. The aircraft control unit 16d can remotely control or autonomously fly (move) the UAV 1 to the transport destination according to the positional information of the transport destination of the cargo C. The autonomous flight of the UAV 1 is not limited to the autonomous flight by the control unit 16 included in the UAV 1 executing the movement control, and includes, for example, the autonomous flight by the entire cargo transport system S executing the movement control.

Furthermore, the aircraft control unit 16d performs different control according to the mechanical load, with respect to the movement of the UAV 1 after the mechanical load is detected by the load detection processing unit 16b. For example, in a case where the load detection process is performed in a state where the UAV 1 is landing, the aircraft control unit 16d causes the UAV 1 to take off or restricts take-off of the UAV 1 depending on the magnitude of the mechanical load. For example, the aircraft control unit 16d sets a numerical range of the mechanical load in advance. Then, in a case where the mechanical load detected by the load detection process falls within the set numerical range, the aircraft control unit 16d causes the UAV 1 to take off (alternatively, in this case, may restrict take-off of the UAV 1).

Moreover, in a case where the success or failure of the detachment of the cargo C is determined in a state where the UAV 1 is landing, the aircraft control unit 16d performs different control on the movement of the UAV 1 after the load detection process is performed, according to the result of the success-failure determination. For example, in a case where it is determined that the detachment of the cargo C has succeeded, the aircraft control unit 16d performs control to cause the UAV 1 to take off (take-off control of the UAV 1). As a result, the UAV 1 can safely take off. On the other hand, in a case where it is determined that the detachment of the cargo C has failed, the aircraft control unit 16d performs control to restrict take-off of the UAV 1 (for example, control to stop the motor of the rotor). As a result, the safety of the UAV 1 can be secured.

Moreover, in a case where the load detection process is performed in a state where the UAV 1 is flying, the aircraft control unit 16d causes the UAV 1 to head toward the next scheduled moving place (for example, the next transport destination or a return destination), causes the UAV 1 to hover in the air, or causes the UAV 1 to land, depending on the magnitude of the mechanical load. For example, the aircraft control unit 16d sets the numerical range of the mechanical load in advance in a plurality of stages (for example, sets first to third numerical ranges different from each other). Then, the aircraft control unit 16d causes the UAV 1 to head toward a next scheduled moving place in a case where the mechanical load detected by the load detection process falls within the first numerical range, causes the UAV 1 to hover in the air in a case where the mechanical load falls within the second numerical range, and causes the UAV 1 to land in a case where the mechanical load falls within the third numerical range.

Moreover, in a case where the success or failure of the detachment of the cargo C is determined in a state where the UAV 1 is flying, the aircraft control unit 16d performs different control on the movement of the UAV 1 after the load detection process is performed, according to the result of the success-failure determination. For example, in a case where it is determined that the detachment of the cargo C has succeeded, the aircraft control unit 16d performs control to cause the UAV 1 to head toward the next scheduled moving place (movement control of the UAV 1). As a result, the UAV 1 can safely head toward the next scheduled moving place. On the other hand, in a case where it is determined that the detachment of the cargo C has failed, the aircraft control unit 16d performs control to cause the UAV 1 to hover in the air (hovering control of the UAV 1) or control to cause the UAV 1 to land (landing control of the UAV 1). As the UAV 1 is caused to hover, the safety of the UAV 1 can be secured. Moreover, as the UAV 1 is caused to land, it is possible to prevent the UAV 1 from moving in an unstable state.

Incidentally, in a case where it is determined that the detachment of the cargo C has failed, the aircraft control unit 16d may determine whether or not the UAV 1 can safely land. The aircraft control unit 16d then causes the UAV 1 to land in a case where it is determined that the UAV 1 can land safely. As a result, the UAV 1 can take off more safely. Whether or not the UAV 1 can safely land may be determined, for example, on the basis of detection data detected by an optical sensor such as a camera. As a result, the determination accuracy as to whether or not the UAV 1 can safely land can be enhanced. Incidentally, the detection data detected by the optical sensor may be image data.

In the examples of FIGS. 3 and 4, an optical sensor OS is attached to one of leg portions 101 of the UAV 1. In this case, if it can be determined that the cargo C does not project below the lower ends of the leg portions 101 by analyzing the detection data detected by the optical sensor OS, the aircraft control unit 16d determines that the UAV 1 can safely land. Alternatively, whether or not the UAV 1 can safely land may be determined on the basis of the winding amount of the wire 118b. As a result, the determination accuracy as to whether or not the UAV 1 can safely land can be enhanced. In this case, if it can be determined that the cargo C does not project below the lower ends of the leg portions 101 from the winding amount, the aircraft control unit 16d determines that the UAV 1 can safely land. On the other hand, in a case where it is determined that the UAV 1 cannot safely land, the aircraft control unit 16d keeps the UAV 1 hovering.

[3. Operation of UAV 1]

Next, the operation of the UAV 1 will be described separately in first to fourth examples. Incidentally, the operation to be described below is an operation after the cargo C is carried on the UAV 1 at a departure point or a waypoint and after the UAV 1 takes off.

First Example

Figure 8:
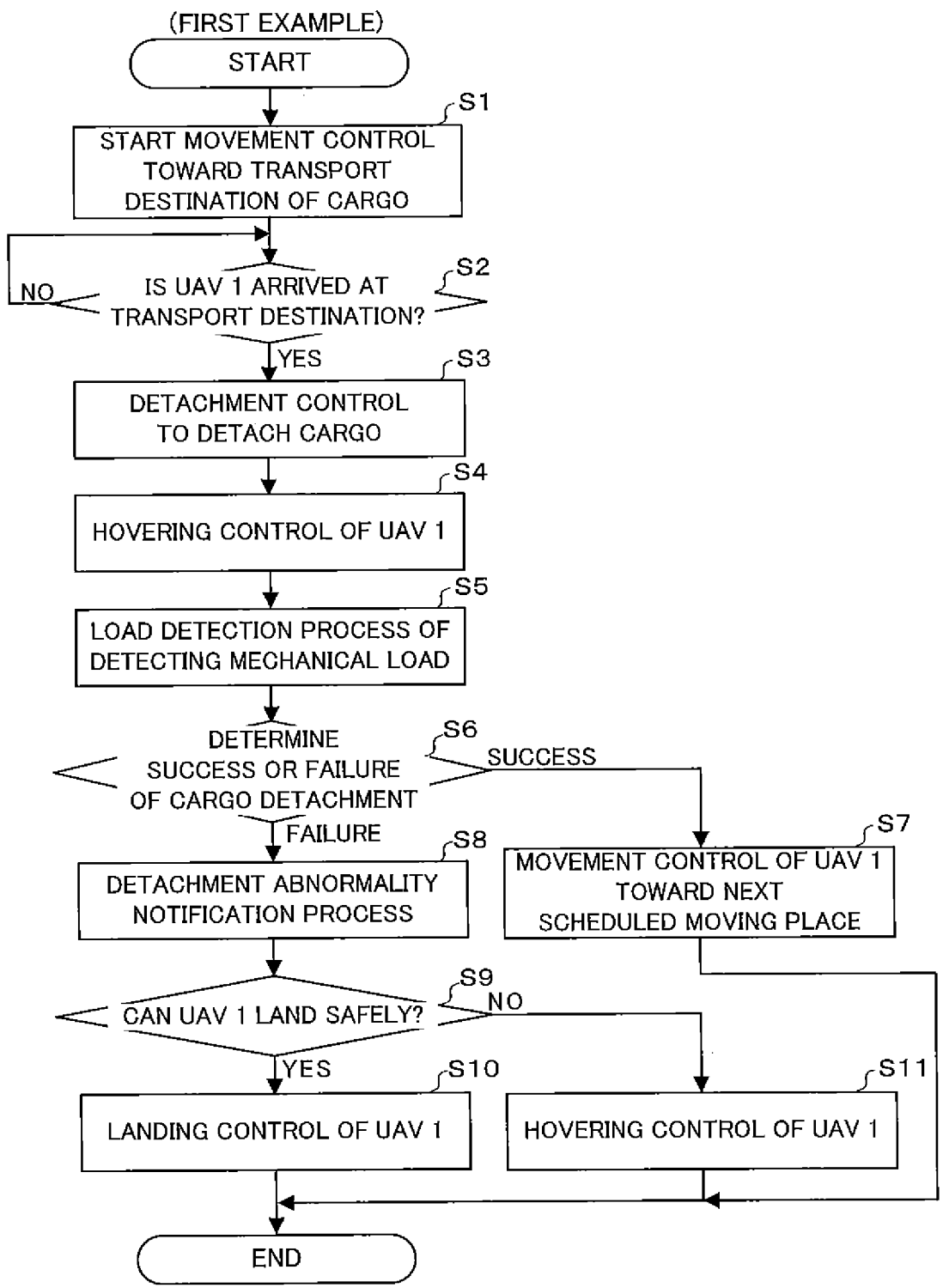
FIG. 8 is a flowchart illustrating an example of a process of the control unit 16 in the UAV 1 according to a first example.

First, a first example of the operation of the UAV 1 will be described with reference to FIG. 8. FIG. 8 is a flowchart illustrating an example of a process of the control unit 16 in the UAV 1 according to the first example. The first example is an example in a case where the detachment control is performed in a state where the UAV 1 including the support portion 117 is flying. In FIG. 8, after the movement control of the UAV 1 toward a transport destination of the cargo C starts (step S1), the control unit 16 determines whether or not the UAV 1 has arrived at the transport destination of the cargo C (step S2).

Then, in a case where it is determined that the UAV 1 has arrived at the transport destination of the cargo C (step S2: YES), the control unit 16 performs detachment control to detach the cargo C from the UAV 1 in a state where the UAV 1 is moving (step S3). As a result, if there is no particular abnormality, for example, the cargo C is dropped onto the port P installed at the transport destination. Incidentally, the detachment control may be performed in a state where the UAV 1 is hovering.

Next, the control unit 16 performs hovering control of the UAV 1 (step S4). As a result, in a state where the UAV 1 is hovering, the control unit 16 performs a load detection process of detecting a mechanical load applied to the support portion 117 (step S5). For example, the load detection processing unit 16b performs the load detection process on the basis of the weight data or the rotation speed of the motor, which is detected as described above, or the like.

Next, in a state where the UAV 1 is hovering, the control unit 16 causes the detachment success-failure determination unit 16c to determine the success or failure of the detachment of the cargo C on the basis of the mechanical load detected in step S5 (step S6).

Then, in a case where the mechanical load detected in step S5 is equal to or less than a threshold value, the control unit 16 determines that the detachment of the cargo C has succeeded (step S6: success), and performs the movement control of the UAV 1 toward the next scheduled moving place (for example, the next transport destination or a return destination) (step S7).

On the other hand, in a case where the mechanical load detected in step S5 is larger than the threshold value (that is, in a case where an abnormal load is applied to the support portion 117), the control unit 16 determines that the detachment of the cargo C has failed (step S6: failure), and proceeds to step S8.

In step S8, the control unit 16 performs a detachment abnormality notification process. In the detachment abnormality notification process, a voice indicating a detachment abnormality is output from a speaker. Moreover, in the detachment abnormality notification process, an email indicating the detachment abnormality may be transmitted to a mail address of a mobile terminal held by a staff member of the port P installed at the transport destination of the cargo C. As a result, it is possible to promptly notify the staff member of the port P of the detachment abnormality.

For example, in a case where the cargo C is caught on some part of the support portion 117, the staff member notified of the detachment abnormality can appropriately respond. Incidentally, since the UAV 1 may occupy the port P until the abnormality is recovered, in the detachment abnormality notification process, a message indicating the detachment abnormality may be transmitted to the control server CS together with the aircraft ID and the aircraft information of the UAV 1. As a result, the control server CS can perform control so that another UAV 1 does not use the port P.

Next, the control unit 16 determines whether or not the UAV 1 can safely land on the basis of, for example, detection data detected by the optical sensor OS (step S9). For example, if it can be determined that the cargo C does not project below the lower ends of the leg portions 101, it is determined that the UAV 1 can safely land. Moreover, if the leg portion 101 of the UAV 1 is sufficiently longer than the vertical length of the cargo C, it can be determined that the UAV 1 can safely land even if the cargo C is caught on some part of the support portion 117.

Then, in a case where it is determined that the UAV 1 can safely land (step S9: YES), the control unit 16 performs landing control of the UAV 1 (step S10). As a result, the UAV 1 lands on the port P, and thus the staff member of the port P can eliminate catching of the cargo C and collect the cargo C.

On the other hand, in a case where it is determined that the UAV 1 cannot safely land (step S9: NO), the control unit 16 performs control to keep the UAV 1 hovering (step S11). Thereafter, the control unit 16 returns the UAV 1 to the departure point or the transit point.

Second Example

Figure 9:
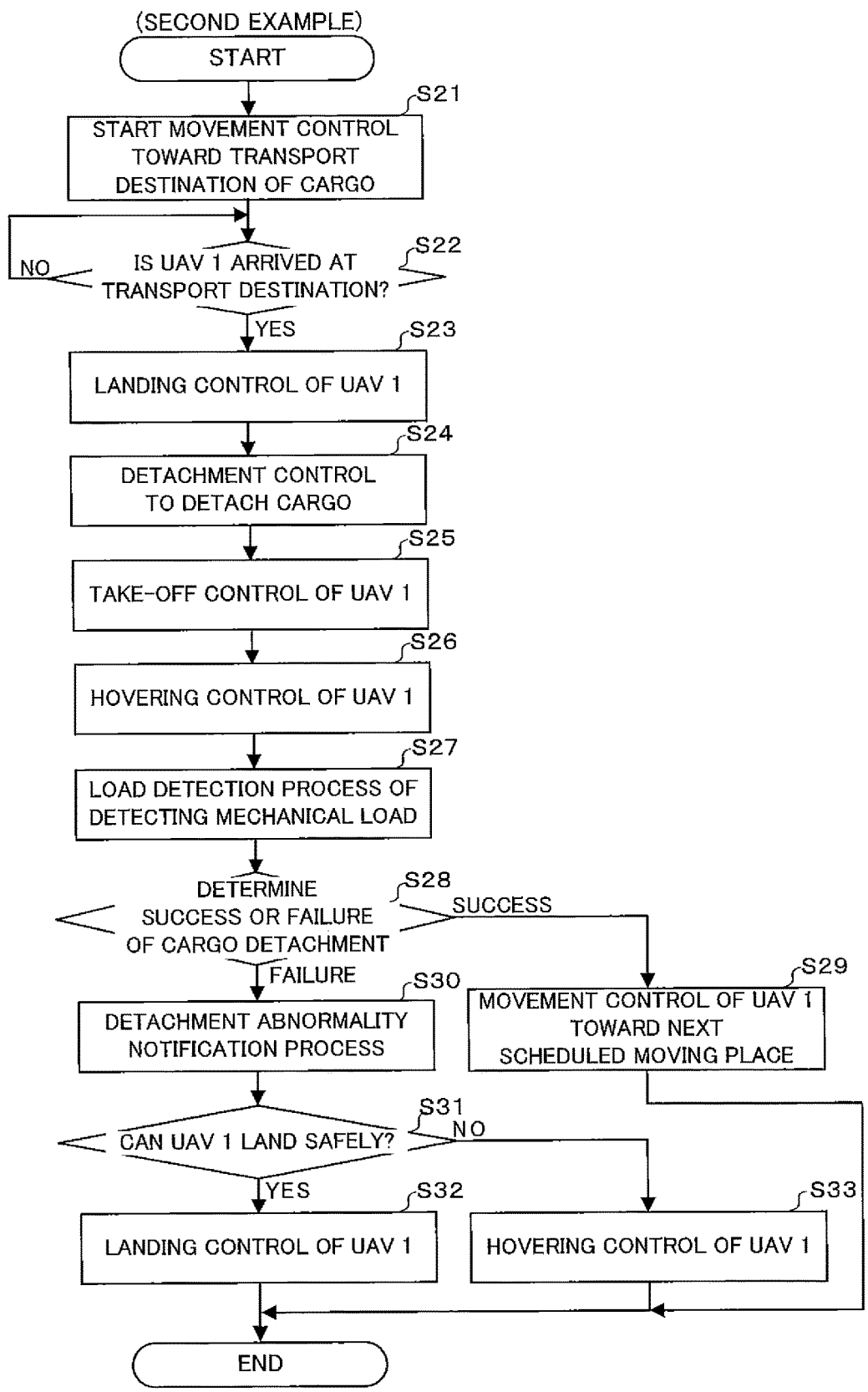
FIG. 9 is a flowchart illustrating an example of a process of the control unit 16 in the UAV 1 according to a second example.

Next, a second example of the operation of the UAV 1 will be described with reference to FIG. 9. FIG. 9 is a flowchart illustrating an example of a process of the control unit 16 in the UAV 1 according to the second example. The second example is an example in a case where the detachment control is performed in a state where the UAV 1 including the support portion 117 is landing. Incidentally, the processes in steps S21 and S22 in FIG. 9 are similar to the processes in steps S1 and S2 in FIG. 8.

In a case where it is determined that the UAV 1 has arrived at a transport destination of the cargo C (step S22: YES), the control unit 16 performs landing control of the UAV 1 (step S23). As a result, after the UAV 1 lands on the port P, the control unit 16 performs the detachment control to detach the cargo C from the UAV 1 (step S24). As a result, if there is no particular abnormality, for example, the cargo C is released on the port P installed at the transport destination.

Next, the control unit 16 performs take-off control of the UAV 1 (step S25). Next, in a case where it is determined that the UAV 1 has reached a predetermined altitude, the control unit 16 performs hovering control of the UAV 1 (step S26). Next, in a state where the UAV 1 is hovering, the control unit 16 performs a load detection process of detecting a mechanical load applied to the support portion 117 (step S27). Incidentally, the processes in steps S28 to S33 in FIG. 9 are similar to the processes in steps S6 to S11 in FIG. 8.

Third Example

Figure 10:
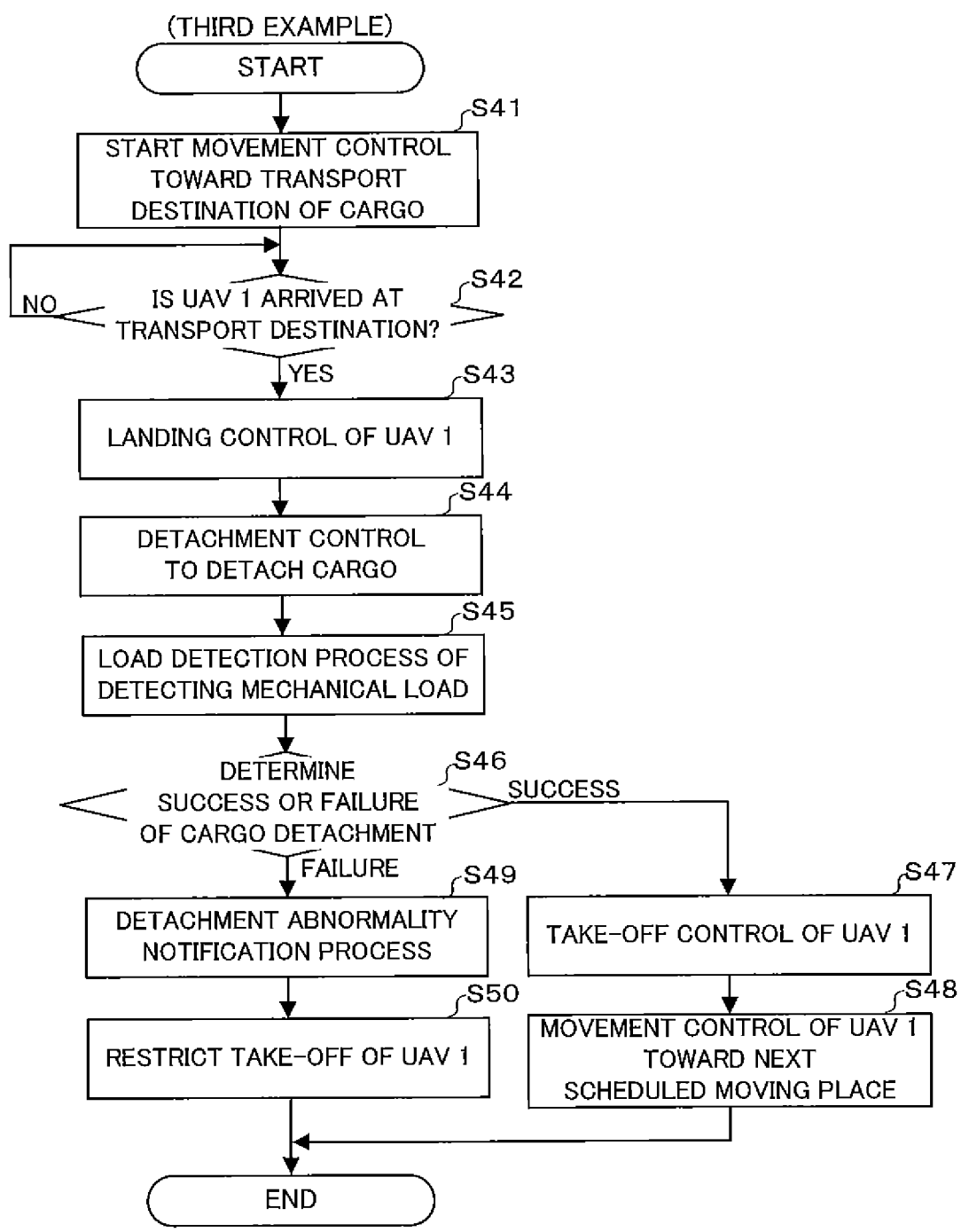
FIG. 10 is a flowchart illustrating an example of a process of the control unit 16 in the UAV 1 according to a third example.

Next, a third example of the operation of the UAV 1 will be described with reference to FIG. 10. FIG. 10 is a flowchart illustrating an example of a process of the control unit 16 in the UAV 1 according to the third example. The third example is an example in a case where the detachment control is performed in a state where the UAV 1 including the support portion 117 is landing. Incidentally, the processes in steps S41 to S44 in FIG. 10 are similar to the processes in steps S21 to S24 in FIG. 9.

Next, in a state where the UAV 1 is landing, the control unit 16 performs a load detection process of detecting a mechanical load applied to the support portion 117 (step S45). Next, in a state where the UAV 1 is landing, the control unit 16 determines the success or failure of the detachment of the cargo C on the basis of the mechanical load detected in step S45 (step S46).

Then, in a case where the mechanical load detected in step S45 is equal to or less than a threshold value, the control unit 16 determines that the detachment of the cargo C has succeeded (step S46: success), and performs the take-off control of the UAV 1 (step S47). Next, the control unit 16 performs the movement control of the UAV 1 toward the next scheduled moving place (for example, the next transport destination or a return destination) (step S48).

On the other hand, in a case where the mechanical load detected in step S45 is larger than the threshold value, the control unit 16 determines that the detachment of the cargo C has failed (step S46: failure), and performs a detachment abnormality notification process as described above (step S49). Next, the control unit 16 restricts take-off of the UAV 1 (step S50). As a result, the UAV 1 is still landing on the port P, and thus the staff member of the port P can eliminate catching of the cargo C and collect the cargo C.

Fourth Example

Figure 11:
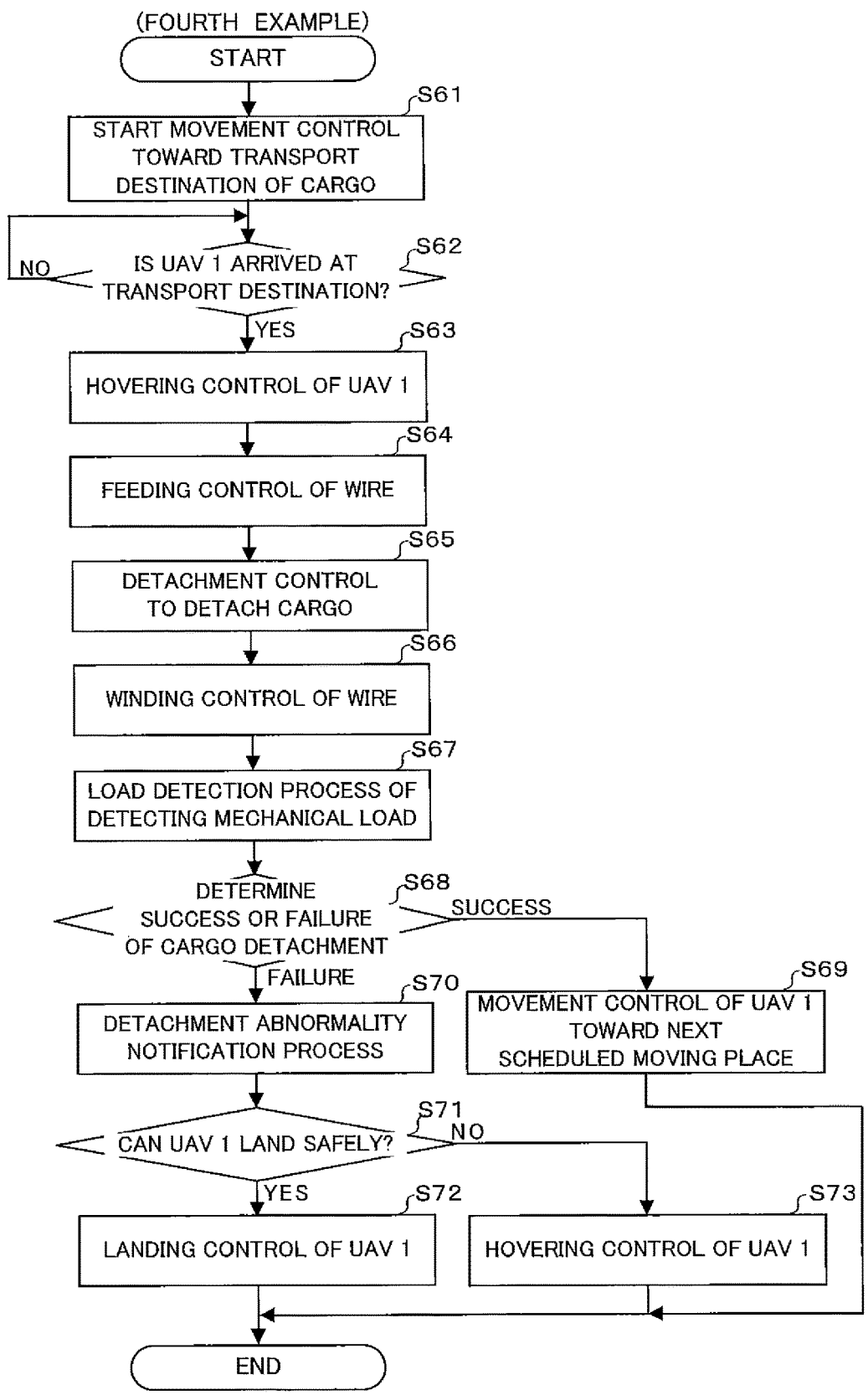
FIG. 11 is a flowchart illustrating an example of a process of the control unit 16 in the UAV 1 according to a fourth example.

Next, a fourth example of the operation of the UAV 1 will be described with reference to FIG. 11. FIG. 11 is a flowchart illustrating an example of a process of the control unit 16 in the UAV 1 according to the fourth example. The fourth example is an example in a case where the detachment control is performed in a state where the UAV 1 including the connecting portion 118 is flying. Incidentally, the processes in steps S61 and S62 in FIG. 11 are similar to the processes in steps S1 and S2 in FIG. 8.

Then, in a case where it is determined that the UAV 1 has arrived at a transport destination of the cargo C (step S62: YES), the control unit 16 performs hovering control of the UAV 1 (step S63). As a result, in a state where the UAV 1 is hovering, the control unit 16 performs feeding control of the wire 118*b* (step S64). Consequently, for example, the cargo C connected to the wire 118*b* via the hook 118*a* is lowered.

Next, for example, in a case where the cargo C has reached the port P (for example, determined on the basis of the feed amount of the wire 118*b*), the control unit 16 performs detachment control to detach the cargo C from the UAV 1 (step S65). For example, the operation of releasing the drive mechanism of the hook 118*a* is performed. As a result, if there is no particular abnormality, for example, the cargo C is released from the hook 118*a*.

Next, the control unit 16 performs winding control of the wire 118*b* (step S66). Next, the control unit 16 performs a load detection process of detecting a mechanical load applied to the connecting portion 118 in a state where the UAV 1 is hovering (step S67). Here, before the winding control is performed in step S66, the control unit 16 may increase the altitude of the UAV 1 (for example, increase by several meters), and then perform the load detection process. Incidentally, the processes in steps S68 to S70 in FIG. 11 are similar to the processes in steps S6 to S8 in FIG. 8.

Next, the control unit 16 determines whether or not the UAV 1 can safely land on the basis of the winding amount of the wire 118*b*, for example (step S71). In a case where it can be determined that the cargo C does not project below the lower ends of the leg portions 101 on the basis of the winding amount of the wire 118*b*, it is determined that the UAV 1 can safely land.

Then, in a case where it is determined that the UAV 1 can safely land (step S71: YES), the control unit 16 performs landing control of the UAV 1 (step S72). On the other hand, in a case where it is determined that the UAV 1 cannot safely land (step S71: NO), the control unit 16 performs control to keep the UAV 1 hovering (step S73).

Incidentally, it is configured in the first to fourth examples such that the success-failure of the detachment of the cargo C is determined on the basis of the mechanical load detected, but the control unit 16 may perform control of the UAV 1 (for example, control indicated in step S7 and subsequent steps illustrated in FIG. 8) according to the mechanical load without determining the success-failure of the detachment of the cargo C.

As described above, according to the embodiment described above, the detachment control to detach the cargo supported by the support portion 117 of the UAV 1 or connected by the connecting portion 118 of the UAV 1 from the UAV 1 is performed, and then, the load detection process of detecting the mechanical load applied to the support portion 117 or the connecting portion 118 is performed, and thereafter, different control according to the mechanical load is performed with respect to the movement of the UAV 1 after the detection of the mechanical load. Since the status of success or failure of cargo detachment is reflected in the mechanical load detected by the load detection process, it is possible to cause the UAV 1 to take an appropriate action according to the status of success or failure of cargo detachment.

Application Example

In the embodiment described above, the control unit 16 of the UAV 1 may perform the release operation detection process of detecting the release operation of the drive mechanism in the support portion 117 or the connecting portion 118 before performing the load detection process. That is, the control unit 16 performs the load detection process after the release operation of the drive mechanism is detected. For example, in a case where the actuator is included in the drive mechanism of the support portion 117 or the connecting portion 118, the release operation of the drive mechanism can be detected by detecting the state (the rotational position, load, or the like) of the motor in the actuator. On the other hand, in a case where the drive mechanism includes an electromagnet, the release operation of the drive mechanism can be detected by detecting whether or not the electromagnet is energized or detecting a magnetic force generated by the electromagnet. Alternatively, the release operation of the drive mechanism may be detected on condition that a control signal is output from the release control unit 16a to the support portion 117 or the connecting portion 118, for example. According to such an application example, as the release operation detection process is separately performed, it is possible to distinguish an abnormality occurred in the drive mechanism of the support portion 117 or the connecting portion 118 (for example, a case where there is a problem in the actuator or the electromagnet, or the like) from an abnormality in a case where the cargo is not released although the drive mechanism operates normally (for example, the cargo is caught).

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. The embodiment has described, as an example, the case where the control unit 16 of the UAV 1 functions as the first control unit that performs the detachment control, the load detection unit that performs the load detection process of detecting a mechanical load, the second control unit that performs different control according to the mechanical load, and the like, but the control server CS may function as a control device and include the first control unit, the load detection unit, the second control unit, and the like. In this case, the control server CS performs the detachment control to detach the cargo supported by the support portion 117 of the UAV 1 or connected by the connecting portion 118 of the UAV 1 from the UAV 1 while appropriately acquiring necessary information from the UAV 1, and then, performs the load detection process of detecting the mechanical load applied to the support portion 117 or the connecting portion 118, and thereafter, performs different control according to the mechanical load, with respect to the movement of the UAV 1 after the detection of the mechanical load. In this case, the detachment control is performed by transmitting a detachment control command from the control server CS to the UAV 1 (or GCS). Moreover, different control according to the mechanical load is performed by transmitting a control command according to the mechanical load from the control server CS to the UAV 1 (or GCS). In this case, the control server CS may determine the success or failure of cargo detachment on the basis of the mechanical load detected, and perform different control on the movement of the UAV 1 after the load detection process is performed according to the result of the success-failure determination. Moreover, the embodiment has described, as an example, the case where the present invention is applied to the UAV 1, but the present invention is also applicable to a manned aircraft that can fly even without an operator (a pilot) in the aircraft.

REFERENCE SIGNS LIST

1 UAV
2 UTMS
11 Cargo carrying unit
12 Drive unit
13 Positioning unit
14 Image capturing unit
15 Radio communication unit
16 Control unit
16a Detachment control unit
16b Load detection processing unit
16c Detachment success-failure determination unit
16d Aircraft control unit
CS Control server
S Cargo transport system

The invention claimed is:

1. A control method that is performed by a system including an aircraft that comprises a connecting portion configured to connect a cargo, the control method including:
   performing detachment control to detach the cargo that is connected by the connecting portion from the aircraft;
   performing a load detection process of detecting a mechanical load applied to the connecting portion after the detachment control is performed;
   performing, in a state in which the aircraft is flying, a success-failure determination of detachment of the cargo on a basis of the mechanical load;
   based on a determination that the detachment of the cargo has failed in the state in which the aircraft is flying, determining whether the aircraft can land safely; and
   performing different control according to the mechanical load, with respect to movement of the aircraft after the mechanical load is detected, the different control including causing the aircraft to land safely based on the determination the aircraft can land safely,
   wherein the connecting portion comprises a wire to which the cargo is connected and a reel that feeds or winding the wire, and
   wherein the determination whether the aircraft can land safely is based on a winding amount of the wire.

2. The control method according to claim 1, the method further comprising:
   performing the success-failure determination in a state where the aircraft has landed; and
   based on a determination that the detachment of the cargo has succeeded, controlling the aircraft to take off.

3. The control method according to claim 1, the method further comprising:
   performing the success-failure determination in a state where the aircraft has landed; and
   based on a determination that the detachment of the cargo has failed, controlling the aircraft to restrict take-off of the aircraft.

4. The control method according to claim 1, the method further comprising:
   based on a determination that the detachment of the cargo has succeeded after performance of the success-failure determination in a state where the aircraft is flying, controlling the aircraft to head toward a next scheduled moving place.

5. The control method according to claim 1, further comprising:
   based on a determination that the detachment of the cargo has failed based on performance of the success-failure determination in the state where the aircraft is flying and based on a determination that the aircraft cannot land safely, cause controlling the aircraft to hover in air.

6. The control method according to claim 1, wherein the determination of whether or not the aircraft can land safely based on detection data detected by an optical sensor included in the aircraft.

7. The control method according to claim 1, wherein the load detection process is performed based on weight data detected by a weight sensor included in the aircraft.

8. The control method according to claim 7, wherein the load detection process is performed in a state where the aircraft is hovering.

9. The control method according to claim 1, wherein
the connecting portion comprises a mechanism that connects or releases the cargo,
the control method further including performing a release operation detection process of detecting a release operation of the mechanism, and
the load detection process is performed after the release operation of the mechanism is detected by the release operation detection process.

10. The control method according to claim 9, wherein the detachment control includes control to cause the mechanism to perform the release operation.

11. The control method according to claim 10, wherein
the mechanism comprises an actuator, and
the release operation is performed by driving the actuator.

12. The control method according to claim 10, wherein
the mechanism comprises an electromagnet, and
the release operation is performed by stopping energization to the electromagnet.

13. A control device for controlling an aircraft comprising a connecting portion configured to connect a cargo, the control device comprising:
at least one memory configured to store program code; and at least one processor configured to access the program code and operate as instructed by the program code, the program code including:
first control code configured to cause the at least one processor to perform detachment control to detach the cargo that is supported by the connecting portion from the aircraft;
load detection code configured to cause the at least one processor to perform a load detection process of detecting a mechanical load applied to the connecting portion after the detachment control is performed;
success-failure determination code configured to cause the at least one processor to perform, in a state in which the aircraft is flying, a success-failure determination of detachment of the cargo on a basis of the mechanical load;
determining code configured to cause the at least one processor to determine, based on a determination that the detachment of the cargo has failed in the state in which the aircraft is flying, whether the aircraft can land safely; and
second control code configured to cause the at least one processor to perform different control according to the mechanical load, with respect to movement of the aircraft after the mechanical load is detected, the second control code configured to cause the aircraft to land safely based on the determination the aircraft can land safely,
wherein the connecting portion comprises a wire to which the cargo is connected and a reel that feeds or winding the wire, and
wherein the determination whether the aircraft can land safely is based on a winding amount of the wire.

14. A control device for controlling an aircraft comprising a support portion configured to support a cargo or a connecting portion configured to connect the cargo, the control device comprising:
at least one memory configured to store program code; and
at least one processor configured to access the program code and operate as instructed by the program code, the program code including:
first control code configured to cause the at least one processor to perform detachment control to detach the cargo that is supported by the support portion or connected by the connecting portion from the aircraft;
load detection code configured to cause the at least one processor to perform a load detection process of detecting a mechanical load applied to the support portion or the connecting portion after the detachment control is performed;
success-failure determination code configured to cause the at least one processor to perform, in a state in which the aircraft is flying, a success-failure determination of detachment of the cargo on a basis of the mechanical load;
determining code configured to cause the at least one processor to determine, based on a determination that the detachment of the cargo has failed in the state in which the aircraft is flying, whether the aircraft can safely land based on a determination of whether the cargo extends below a leg portion of the aircraft; and
second control code configured to cause the aircraft to land safely based on the determination the cargo does not extend below the leg portion of the aircraft.

* * * * *